H. M. SPRAGUE.
STARTING DEVICE FOR GAS OPERATED AUTOMOBILE ENGINES.
APPLICATION FILED JULY 21, 1914.
1,151,130.
Patented Aug. 24, 1915.
3 SHEETS—SHEET 1.
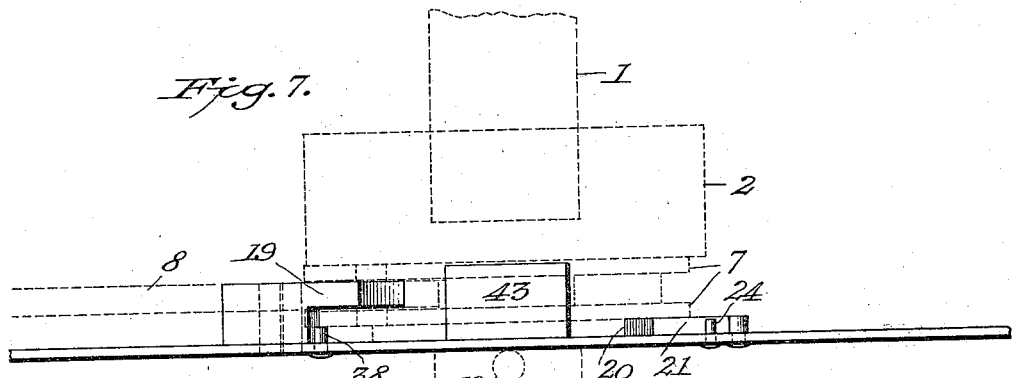
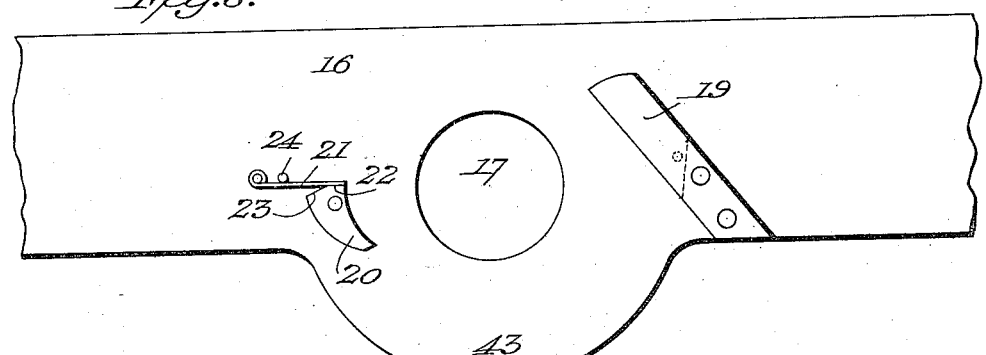
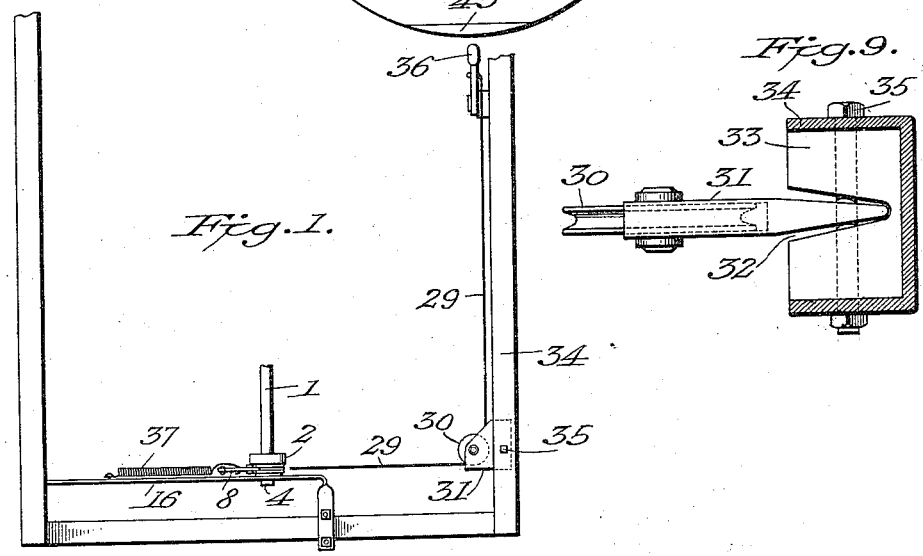
Witnesses:
G. Sargent Elliott
Elizabeth Smith
Inventor:
By Horace M. Sprague.
H. S. Bailey. Attorney

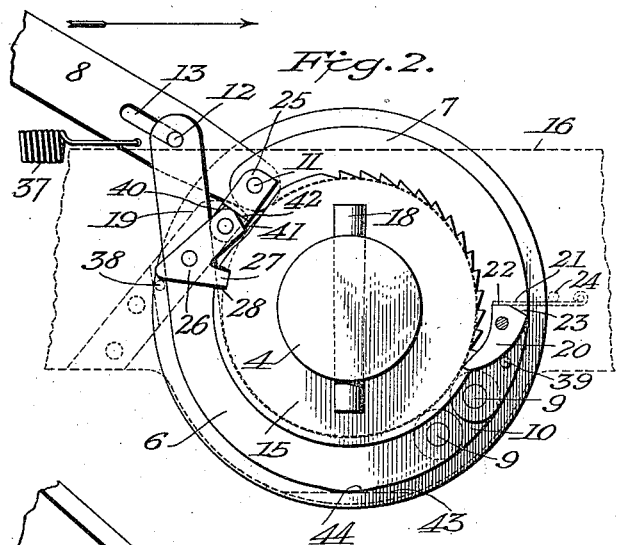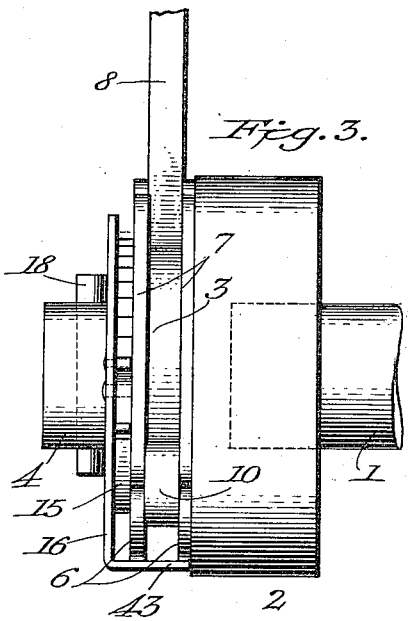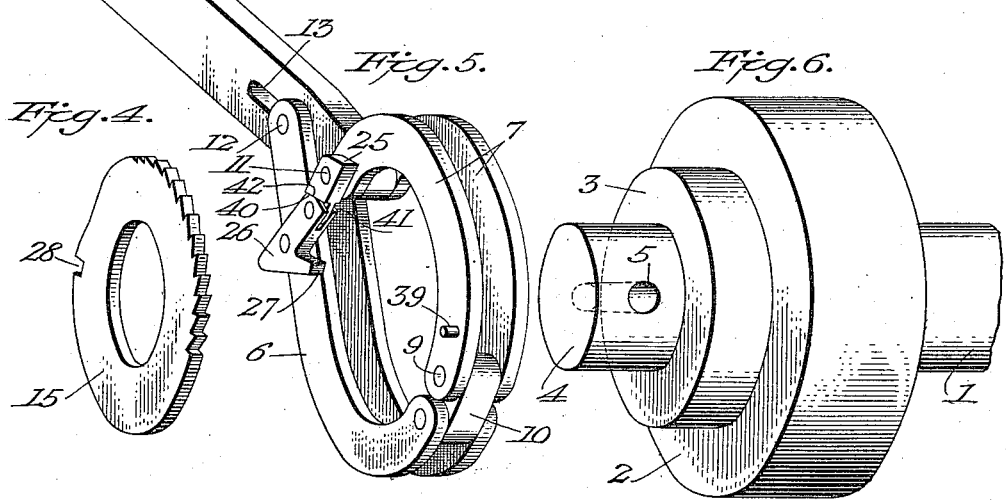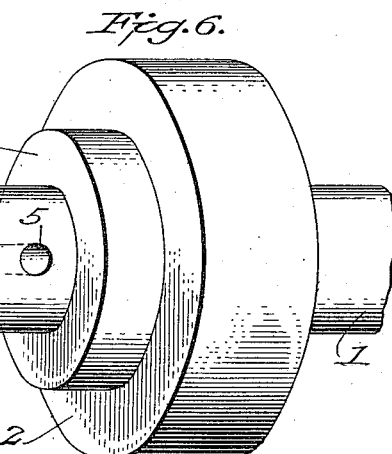

H. M. SPRAGUE.
STARTING DEVICE FOR GAS OPERATED AUTOMOBILE ENGINES.
APPLICATION FILED JULY 21, 1914.
1,151,130.
Patented Aug. 24, 1915.
3 SHEETS—SHEET 3.
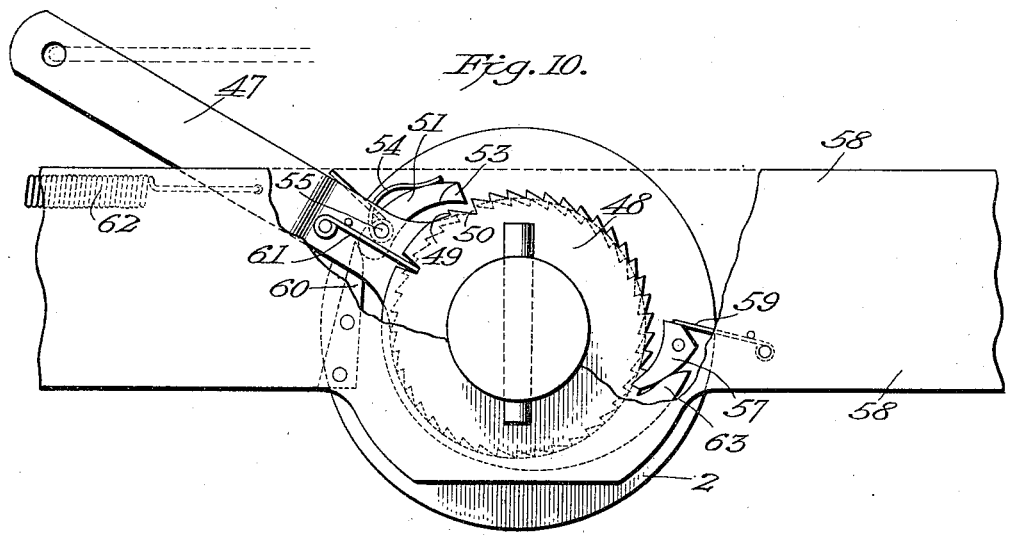
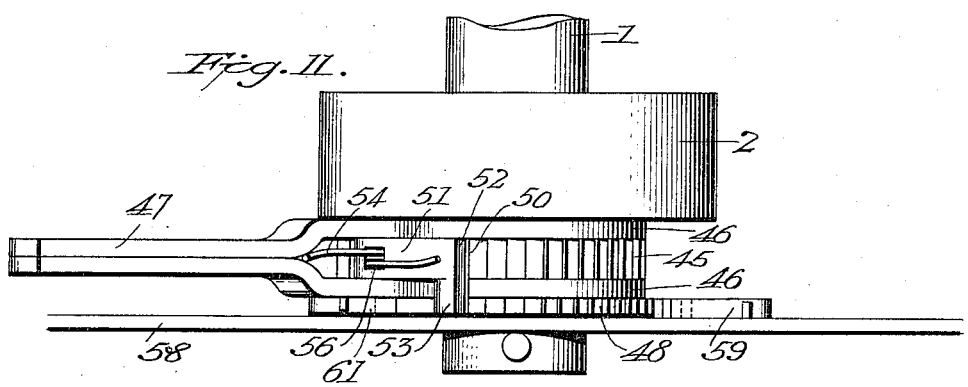
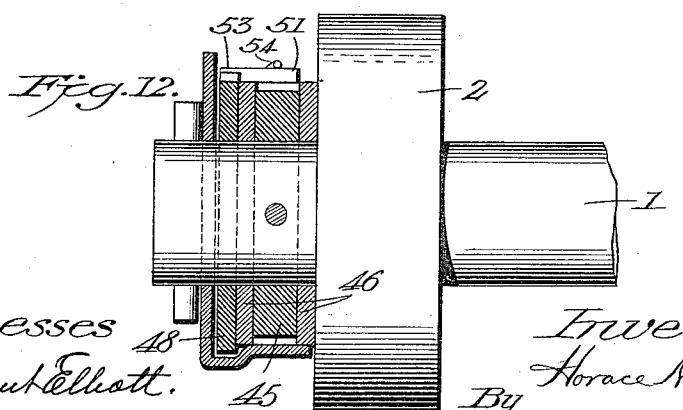
Witnesses
G. Sargent Elliott.
Elizabeth Smith
Inventor:
Horace M. Sprague.
By H. S. Bailey. Attorney.

UNITED STATES PATENT OFFICE.

HORACE M. SPRAGUE, OF DENVER, COLORADO.

STARTING DEVICE FOR GAS-OPERATED AUTOMOBILE-ENGINES.

1,151,130.  Specification of Letters Patent.  Patented Aug. 24, 1915.

Application filed July 21, 1914. Serial No. 852,225.

*To all whom it may concern:*

Be it known that I, HORACE M. SPRAGUE, a citizen of the United States of America, residing in the city and county of Denver and State of Colorado, have invented a new and useful Starting Device for Gas-Operated Automobile-Engines, of which the following is a specification.

This invention relates to starting devices for automobile and other internal combustion engines.

The object of the invention is to provide a crank shaft gripping device which is connected with an operating lever, said device being adapted to frictionally engage the crank shaft of the engine, when the lever is operated, to turn the said shaft and thus effect a compression and ignition of gas in one or more of the engine cylinders, whereby the engine is started. Further, to provide a lever-operated, crank-shaft engaging device which is adapted to automatically release the shaft when the same is violently turned in a reverse direction due to a "kick back," and thus prevent injury to the person operating the lever, the device being also adapted to automatically release the crank shaft simultaneously with the starting of the engine, and return to its initial position. These objects are accomplished by the mechanism illustrated in the accompanying drawings, in which:

Figure 1, is a view illustrating the application of the improved starting device. Fig. 2, is a front elevation—full size—of the starting device. Fig. 3, is a side view of the same, showing more clearly the manner of its connection with the crank shaft of the engine. Fig. 4, is a perspective view of the ratchet ring which moves with the gripping device. Fig. 5, is a perspective view of the gripping device. Fig. 6, is a perspective view of the fan-driving pulley which is rigidly secured to the outer end of the crank shaft, and which is provided with a circular projection or collar upon which the improved gripping device is mounted. Fig. 7, is a top plan view of Fig. 2, showing the starting mechanism in dotted lines, and a supporting plate and parts carried thereby, in full lines. Fig. 8, is a rear view of the supporting plate and parts carried thereby. Fig. 9, is a view showing a section of a side bar of an automobile frame, and the manner of securing thereto an automatically adjustable sheave pulley, over which passes the cord or chain connecting the lever of the starting device with a hand operating lever. Fig. 10, is a front view of a modified form of starter. Fig. 11, is a top plan view of the same. And Fig. 12, is a side view thereof partly in section.

Similar letters of reference refer to similar parts throughout the several views.

Referring to the drawings, the numeral 1 designates the crank shaft of an automobile engine, upon the outer end of which is rigidly secured, in any suitable manner, a pulley 2, which is belted to the usual fan pulley, not shown. Secured to or formed integral with the outer face of the pulley 2, is a circular projection or collar 3, upon which is mounted the improved starting mechanism, and upon this collar is formed a circular projection 4, having a hole 5, the purpose of said projection and hole being hereinafter set forth.

The improved friction gripping device comprises pairs of substantially semi-circular gripping members 6 and 7, and an actuating lever 8, which are arranged in the following manner: The lower ends of the gripping members 6 and 7, are pivotally connected by pins 9, to opposite ends of a link 10, which passes between them. The upper ends of the gripping members 7 are pivotally connected by a pin 11 to the inner end of the actuating lever 8, which passes between them, while the upper ends of the members 6 terminate in straight portions which are pivotally connected by a pin 12 to the lever 8, beyond the point of connection therewith of the members 7, the pin 12 passing through a slot 13 in the lever 8, as shown in Fig. 2. By this construction, it will be seen that, when the lever 8 is moved in the direction of the arrow, Fig. 2, the gripping members 6 and 7 are caused to frictionally engage the collar 3, whereby the crank shaft is turned.

The gripping mechanism above described, is adapted to turn the crank shaft to start the engine, but means must be provided to prevent the lever 8 being thrown violently in a reverse direction by a "kick back," and to accomplish this, I employ the following mechanism: Upon the projection 4, is loosely mounted a washer 15, which rests against the collar 3, the circumferential edge of which washer is ratchet toothed for substantially a third of its extent, beginning at its uppermost point and extending around in the direction of rotation of the crank shaft. This washer is adapted to be turned by the gripping device, and also to be prevented from reverse movement upon the occurrence of a "kick back," thereby to release the gripping mechanism and thus permit the reverse rotation of the crank shaft independently of the gripping device, and I accomplish these results in the following manner: Upon the projection 4 is mounted a plate 16, having an aperture 17, through which the projection 4 passes, and this plate is held upon the said projection and against the washer 15, in any suitable manner, but preferably by a pin 18, which is driven into the hole 5 in the projection 4, and the ends of the plate are secured to the frame of the machine in any suitable manner. On the inner face of the plate 16, and to one side of the hole 17 therein, is rigidly secured a stop finger 19, the upper end of which extends between the straight ends of the gripping members 6, in position to engage the inner end of the lever 8, when the said lever is moved to its starting position, thereby to release the gripping members from frictional engagement with the hub 3, as will be more fully set forth hereinafter. A pawl 20, is pivotally mounted on the plate in position to engage the lowermost tooth of the ratchet washer 15, when the lever 8 is at the starting position, and this pawl is held to engage the teeth of the washer 15, preferably by a blade spring 21, the free end of which bears upon a flat surface 22, of the top end of the pawl, when the same is in the position shown in Fig. 2, the pawl being held out of engagement with the teeth by the engagement of the spring 21, with a similar flat surface 23, at an angle to the surface 22, the pawl being thrown out of engagement with the said teeth in a manner to be presently described. The other end of the spring 21 is riveted to the plate 16, and a tension pin 24 extends through the plate and holds the spring down against the top of the pawl. Upon the pin 11, which connects the inner end of the lever 8 with the upper ends of the grippers 7, is pivotally mounted the outer end of the member 25 of a jointed dog, the other end thereof being pivotally connected to the inner end of the other member 26, of the said dog, and the outer portion of this member 26 is pivotally connected to the adjacent gripping member 6. A hook 27 is formed on the outer portion of the member 26 of the dog, and this hook enters a notch 28, in the circumferential edge of the washer 15, whereby the said washer is turned with the gripping device. To the outer end of the lever 8, is secured one end of a suitable flexible connection 29, preferably a light wire cable, and this cable is passed around a sheave pulley 30, which is mounted in a hanger 31, which is secured at its free end in a V-shaped recess 32, in a block 33, which fits within one of the channel side bars 34 of the frame of the machine, a bolt 35 passing through the said channel bar, the block and the hanger. The portion of the hanger which enters the recess 32, is tapered, as shown by Fig. 9, so that the hanger with its pulley is permitted an up and down movement, of sufficient range to accommodate the varying angles of the cable, as the lever 8 swings from one extreme position to the other. After passing around the pulley 30, the opposite end of the cable 29 is secured to a suitable operating lever, which may be either a hand or a foot lever, in proximity to the steering post, so as to be easily operated by the person driving the car. I have, however, shown a hand lever 36, which must be pulled to draw on the cable, its lower end being pivoted, and the cable consequently being secured to it above its pivotal connection. Should a foot lever be employed, the cable would obviously be attached to the same, below its pivotal connection.

The operation of the improved starting device is as follows: The attendant draws upon the operating lever 36, which is connected to the grip lever 8, by the cable 29, and the lever 8 is swung over in the direction of the arrow shown in Fig. 2, the initial movement thereof causing the pin 11 at its inner end to draw upon the grippers 7, and the pin 12 to draw upon the grippers 6, whereby both pairs of grippers are caused to frictionally engage the collar 3, on the fan pulley, which is rigidly secured to the crank shaft, and when once in frictional engagement with said collar, the gripping power is augmented as greater power is applied to the outer end of the lever 8. The jointed dog, in its normal position, is bowed slightly inward toward the edge of the washer 15, and the hook 27 on its member 26 rests in the notch 28 in the washer 15. As the lever swings over, the washer 15 moves in unison with the grippers, which turn the crank shaft through their engagement with the collar 3, and if there is no "kick back," the lever 8 swings until the outer end of the member 25 of the jointed dog, engages the flat surface 22 of the pawl 20, and throws the said pawl out of engagement with the ratchet teeth of the washer 15, which is then permitted to turn in a reverse direction, and when the attendant releases or pushes back the operating lever 36, the grip lever 8 is swung to its initial position by means of a coil spring 37, which is secured at one end to the said lever 8, and at its opposite end to the plate 16, the tension on the grippers being broken simultaneously with the releasing of the operating lever, when the spring 37 exerts a grip-releasing pull on the lever 8. When the lever 8 reaches its starting position, the grippers are positively released, by the engagement of the inner end of the said lever with the stop or abutment 19, which tilts the lever 8 and releases the grippers, and simultaneously the outer end of the member 26 of the dog engages a pin 38, which projects from the plate 16, and thus coöperates in releasing the grippers, and holding the dog in the position shown in Fig. 2. When the pawl 20 is thrown out of engagement with the teeth of the washer 15, it is held in such position by the engagement of the blade spring 21 with its flattened surface 23, but when the grippers assume their normal position, the said pawl 20 is again swung into engagement with the teeth of the washer 15, by a pin 39, which projects from the adjacent gripping member 7, in position to engage the curved outer edge of the said pawl. If a "kick back" should occur at any time after the lever 8 begins to swing forward, reverse movement of the grippers, the lever 8, and the operating lever 36, is instantaneously checked, by the engagement of the pawl 20 with a tooth of the washer 15, which instantly checks the reverse movement of the said washer, and this sudden check on the washer also checks the backward movement of the grippers, which are still in frictional engagement with the collar 3, by reason of the engagement of the hook 27 of the jointed dog member 26 with the notch 28 in the said washer, and the sudden check on the grippers causes the jointed dog to be thrown from a bowed or unlocked position to a straight or locked position, the inner end of the member 26 of the dog having flattened stop surfaces 40 and 41, which engage a shoulder 42 on the member 25, the surface 40 engaging the shoulder 42, when the dog is unlocked, and the surface 41 engaging the shoulder 42, when the dog is locked. Thus, when the dog is straightened or locked by the sudden check caused by the engagement of the hook 27 with the washer notch 28, the members 6 and 7 of the gripping device are thrown apart, or out of frictional engagement with the collar 3, thereby permitting the crank shaft to rotate backward independently of the gripping device, thus preventing injury to the mechanism and to the person operating the lever 36. When the lever is again drawn to its starting point by the spring 37 after being moved forward to release the pawl 20, the end of the dog member 26 engages the pin 38, by which the joint in the dog is broken, and at the same time, the end of the lever 8 engages the stop 19, which insures the release of the grippers. The plate 16 has a right angled lip 43, which extends beneath the gripping members 6, and the lower outer edges of said grippers 6 have slight projections 44, formed thereon, which engage the said lip 43, when the lever 8 is in its normal position, and by this means, the weight of the gripping device is supported, so that the gripping edges of the grippers are prevented from being worn, when the engine is in operation.

In Figs. 10, 11, and 12, I have illustrated a modified form of my device, which is as follows: Upon the end of the crank shaft 1, is rigidly secured a ratchet toothed collar 45, a slight distance from the fan driving pulley 2, and so as to lie between the members 46 of a bifurcated lever 47, the members 46 having openings through which the crank shaft passes. A washer 48 is placed on the crank shaft against the outside member 46, of the lever 47, and this washer is of slightly greater diameter than the collar 45, and is ratchet toothed for approximately a third of its circumference, beginning to the left of its vertical center and extending around the washer in the direction of rotation of the crank shaft. The first tooth 49 of this washer, is of very slight depth, but the second tooth 50 is cut in to the depth of the crotch of the teeth of the collar 45, the remaining teeth being beyond the plane of the teeth of the said collar 45. A pawl 51 is pivotally mounted between the members 46, and adjacent to the crotch of the lever 47. This pawl has a point 52, adapted to engage the teeth of the collar 45, and an extension 53, which is adapted to engage either the tooth 49 or the tooth 50 of the washer 48, as will hereinafter be more fully explained. A spring 54 surrounds the pivot pin 55 of the pawl 51, the ends extending through a slot 56 in the pawl, and one end bearing against the pawl so as to press it toward the circumferential edge of the washer 48. A pawl 57 is pivotally mounted on a plate 58, which corresponds to the plate 16, the pawl corresponding to and performing the same function as the pawl 20 in Fig. 2, and being held in either operative or inoperative position by a blade spring 59. A finger 60, which is rigidly secured to the plate 58, extends into the crotch portion of the lever 47, and its upper end is inclined and is adapted to engage the adjacent end of the pawl 51, when the lever 47 is in its initial position and hold its forward end out of engagement with either of the teeth 49 or 50, as shown by Fig. 10. The lever carries a blade spring 61, the free end of which enters a notch in the circumferential edge of the washer 48, and tends to maintain the washer in the position shown in Fig. 10, as will be hereinafter set forth.

In operation, when the lever 47 is drawn upon, the pawl 51 is released from contact with the finger 60, and is instantly thrown by the spring 54 to engage the tooth 50 of the washer 48, and also one of the teeth of the collar 45. As the lever is swung forward, the crank shaft is turned, and if there is no "kick back," the lever continues until the free end of the pawl 51 engages the pawl 57, and throws it out of engagement with the teeth of the washer 48, when the lever 47 is retracted by a coil spring 62, and when it reaches its initial or starting position, the pawl 51 is engaged by the finger 60, and lifted out of engagement with the tooth 50 of the washer. Should a "kick back" occur at any time after the lever starts forward, the washer 48 is instantly checked by the pawl 57, but as the pawl 51 is engaged by a tooth of the collar 45, the lever is thrown backward, but only far enough for the pawl 51 to pass from the tooth 50 to the tooth 49, by which it is lifted out of engagement with the teeth of the collar 45, thus permitting the backward rotation of the crank shaft independently of the starting device, which is drawn back by the spring 62. As the lever 47 reaches its initial position, after being moved forward to release the pawl 57, the pawl 51 is engaged by the finger 60, and lifted out of engagement with the tooth 49, and the washer 48 is instantly moved by the blade spring 61, just far enough to bring the tooth 50 in position to be engaged by the pawl 51, when the lever is again swung forward. The pawl 57 after being thrown out of engagement with the teeth of the washer 48, in the manner above described, remains in an inoperative position, until the lever 47 returns to the starting point, when the said pawl 57 is engaged by a projection 63 on the washer 48, and moved into operative position again, as will be understood by reference to Fig. 10. Either the preferred or the modified form of the starter can be applied to the crank shafts of any of the types of gas operated automobile engines in common use, without in any way changing the arrangement or construction of the machine.

Having described my invention, what I claim as new and desire to secure by Letters Patent is:

1. In a starting device for gas operated engines, the combination with the engine crank shaft, of a frictional engaging device surrounding said shaft for giving the same a partial rotation, means for instantaneously releasing the engaging device at any point in its operative movement upon the occurrence of a kick back, and means for restoring the engaging device to its initial position.

2. In a starting device for gas operated engines, the combination with the engine crank shaft, of a frictional gripping device, surrounding said shaft, means for actuating said device to grip the shaft and for turning the said device, means for instantaneously releasing the gripping device at any point in its operative movement upon the occurrence of a kick back, and a spring connected with the grip actuating means, for restoring the parts to their initial positions.

3. In a starting device for gas operated engines, the combination with the engine crank shaft, of a friction grip device for giving said shaft a partial rotation, means for actuating said device to grip the shaft and for turning the same with the shaft, means for releasing the gripping device upon the occurrence of a kick back without reversing the movement of the actuating means, a spring connected with the actuating means for restoring the parts to their initial positions, and means for engaging the said actuating means to insure the positive release of the grip, upon return of the same to its initial position.

4. In a starting device for gas-operated automobile engines as specified, the combination with the engine crank shaft, of friction-grip members on said shaft, a lever for drawing said members into gripping engagement, a ratchet washer loosely mounted on the crank shaft, a fixed member, a pawl on said fixed member for engaging said ratchet washer, means connecting the grip members with the ratchet washer to cause said washer to turn with the grip members, said means being also adapted for throwing said pawl out of engagement with the ratchet when the grip members reach the limit of their operative movement, said pawl being adapted also to check reverse movement of the washer upon the occurrence of a "kick back," whereby the grip members through their connection with the said washer are released, and a spring for restoring said starting device to its normal position.

5. In a starting device for gas operated automobile engines as specified, the combination with the engine crank shaft, of a collar thereon, substantially semi-circular gripping members surrounding said collar and pivotally connected to a link at one end, an actuating lever connected to the other ends of said gripping members in such manner as to cause them to frictionally engage the collar when the lever is drawn upon, a ratchet washer loosely mounted on the crank shaft, a fixed member, a pawl on said fixed member in engagement with the ratchet washer, means connecting the gripping members and engaging the ratchet washer, whereby the said washer is caused to move with the gripping members, said pawl being adapted to check the reverse movement of the ratchet washer upon the occurrence of a "kick back," whereby the gripping members are released from frictional engagement with the said collar, through their connection with the ratchet washer, said pawl being thrown out of engagement with the ratchet washer when the gripping members reach the limit of their operative movement, by the engagement therewith of the gripping member and ratchet washer connecting means, means for reversing the movement of the gripping members, and means for engaging the pawl and moving it again into engagement with the ratchet washer, as the gripping members reach their normal position.

6. In a starting device for gas operated automobile engines as specified, the combination with the engine crank shaft having a collar thereon, of pairs of substantially semi-circular grippers surrounding said collar and connected at one end to a common link, an actuating lever, the inner end of which is pivotally connected to one pair of grippers, the other pair of grippers being connected to the lever beyond its point of connection with the first pair, a projection on the said collar and a ratchet toothed washer mounted thereon, having a notch, a jointed dog, the members of which are pivotally connected at their ends to the pairs of grippers, and a hook on one of said members which engages the notch in said washer, a pawl which normally engages the said notched washer, and manually operated means for swinging said actuating lever, whereby the grippers frictionally engage said collar to turn the crank shaft, said washer being turned in unison with said grippers, said pawl acting to check the reverse movement of the washer under a "kick back," whereby the dog is caused to release the grippers, through its connection with said grippers and washer, said dog also acting to throw the pawl to release the washer when the grippers reach the limit of their forward movement, and means for restoring them to their normal position.

7. In a starting device for gas operated engines, as specified, the combination with the crank shaft, of friction grippers for turning the same, a rotatable ratchet element, means connecting the grippers and engaging the ratchet element to rotate the same in unison with said grippers, and a pawl for checking the reverse rotation of the ratchet element under a "kick back," whereby the grippers are released, through their connection with the washer, a pawl in engagement with the washer, and which is thrown to release said washer by the said gripper and washer connecting means, when the grippers are moved to the limit of their forward movement, and a spring for restoring the grippers to their normal position.

8. In a starting device for gas operated engines as specified, the combination with the crank shaft, of substantially semi-circular grippers thereon, having a link connection at one end, an actuating lever to which the opposite ends of the grippers are attached at points one beyond the other, whereby when the lever is rocked in one direction the grippers are caused to engage the shaft, a ratchet element having a notch, a pawl for engaging said ratchet element, a jointed dog connecting said grippers and having a hook portion entering said notch, whereby the ratchet element is turned with the grippers, said pawl being adapted to check reverse rotation of the ratchet element under a "kick back," whereby the dog is caused to release the grippers, said pawl being released by contact with the dog when the grippers are moved to the limit of their forward movement, a spring for returning the grippers to their normal position and means for moving the pawl back into engagement with the ratchet element, when the grippers reach their normal positions.

9. In a starting device for gas operated engines as specified, the combination with the crank shaft, of substantially semi-circular friction gripping members on said shaft, having a link connection at one end, an actuating lever pivotally connected at one end to one gripping member, the other gripping member being pivotally connected to the lever beyond the point of connection therewith of the first gripping member, a jointed dog connecting said gripping members opposite their link connection, the joint in said dog being normally broken, a ratchet element on said shaft connected to said dog and moved thereby, and a pawl in engagement with the ratchet element and adapted to check backward rotation of the ratchet element under a "kick back," whereby the dog is straightened and the grippers are thereby released, said pawl being thrown out of engagement with the ratchet element by one end of said dog when the grippers are turned to the limit of their starting movement, means for returning the grippers to their normal position, and a pin on one of said grippers for engaging and throwing said pawl into engagement with the ratchet element, when the grippers assume their normal position.

10. In a starting device for gas operated engines as specified, the combination with the crank shaft, rotatable gripping devices thereon and a ratchet element movable with the gripping devices, of a pawl engaging said ratchet element having flattened surfaces on its pivoted end, arranged at an angle, a blade spring for engaging one of said surfaces to hold the pawl in operative position and for engaging the other surface to hold the pawl in an inoperative position, said pawl being adapted to check backward rotation of the ratchet element under a "kick back," grip releasing means connecting the grippers and the ratchet element, which releases said grippers simultaneously with the checking of the ratchet element, said releasing means being adapted to throw the pawl out of engagement with the ratchet element when the grippers are turned to the limit of their forward movement, means for restoring the grippers to their normal position, means for holding the grippers in released relation when in their normal position, and means for throwing the pawl in engagement with the ratchet element, when the grippers reach their normal position.

11. In a starting device for gas operated engines, the combination with the crank shaft, of semi-circular, hinge connected friction grippers on said crank shaft and surrounding the same, an actuating lever pivotally connected to said grippers, a stationary member, a finger secured upon said stationary member and adapted to engage the actuating lever and hold said grippers in released relation during the operation of the engine, a manually operated lever, a flexible connection extending from the actuating lever to the manually operated lever, and an adjustable pulley around which the flexible connection passes, means for releasing the grippers under a "kick back," and means for restoring the starting device to its normal position.

12. In a starting device for gas operated engines, the combination with the crank shaft, of a collar rigidly mounted on said shaft, a lever, and means connected therewith for engaging said collar to turn said shaft in one direction, a toothed washer on said shaft also engaged by said collar engaging means and movable with said lever, a pawl for checking backward rotation of the washer under a kick-back, whereby the collar-engaging means, through its engagement with the washer, releases the said collar and permits reverse rotation of the shaft, said collar-engaging means being also adapted to release the washer checking pawl when the lever is thrown forward to the limit of its movement, whereby the lever and collar can be turned backward to their initial position, and means for throwing the pawl into engagement with the toothed washer when the lever reaches the said initial position.

In testimony whereof I affix my signature in presence of two witnesses.

HORACE M. SPRAGUE.

Witnesses:
G. SARGENT ELLIOTT,
ELIZABETH SMITH.

Copies of this patent may be obtained for five cents each, by addressing the "Commissioner of Patents, Washington, D. C."